(No Model.)
R. WEHL.
PNEUMATIC TIRE REPAIRER.
No. 578,433. Patented Mar. 9, 1897.
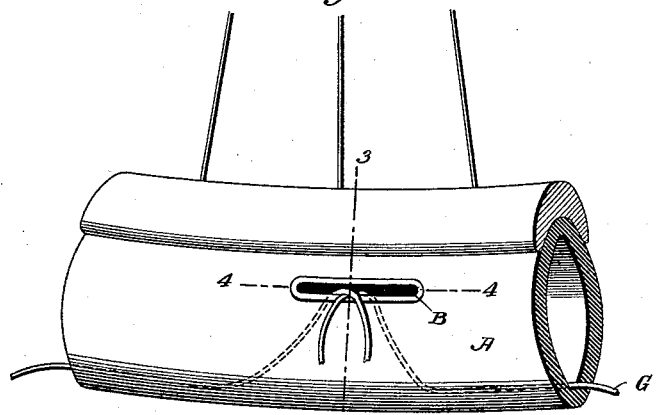
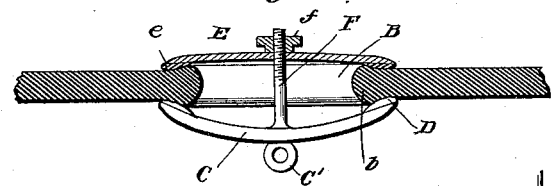
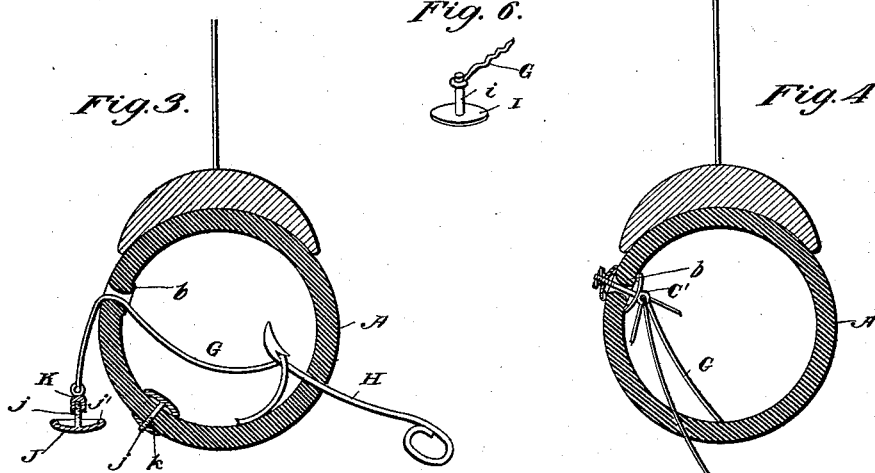
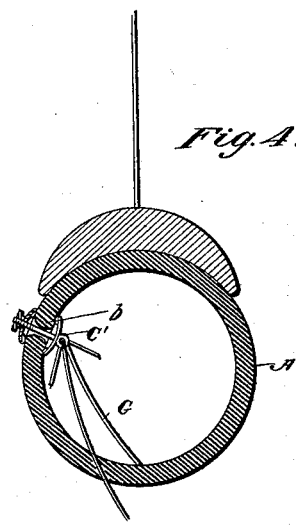
Witnesses
Edw. D. Duvall Jr.
E. S. Poole
Inventor
Richard Wehl
By Frankland Jannus
his Attorney

UNITED STATES PATENT OFFICE.

RICHARD WEHL, OF DEFIANCE, OHIO.

PNEUMATIC-TIRE REPAIRER.

SPECIFICATION forming part of Letters Patent No. 578,433, dated March 9, 1897.

Application filed May 21, 1896. Serial No. 592,466. (No model.)

*To all whom it may concern:*

Be it known that I, RICHARD WEHL, a citizen of the United States, residing at Defiance, in the county of Defiance and State of Ohio, have invented certain new and useful Improvements in Pneumatic-Tire Repairers, of which the following is a description, reference being had to the accompanying drawings and to the letters of reference marked thereon.

My invention relates to improvements in means and apparatus for repairing pneumatic tires of the single-tube or hose-pipe type.

Heretofore it has been usual to repair punctures in this class of tires by forcing a piece of repair material, such as a special repair-plug, into the tire through the puncture from the outside. This plan is open to objection for the reason that plugs of a limited size only can be forced through the opening, and if the same be very small it must be increased in size to allow the passage of a plug of any size, since even the apparatus for introducing the plug is necessarily larger in itself than many of the holes which would permit the escape of air.

According to my present invention I propose to make all repairs by introducing the patching material, which may be the ordinary plugs now in use, from the inside of the tire, so that nothing larger than the stem or shank of the plug is required to pass through the puncture. With this arrangement a patch of any desired size may be applied to the inside of the tire, and not only will the escape of air be prevented by the use of a suitable patch, but it becomes possible to use much larger patches and patches which will also afford strength and support about the injured place, so that if properly applied the swelling ordinarily observable about a mended puncture may be entirely prevented. By my method it is also practicable to repair on the road cuts which cannot be mended by the insertion of patch material from the outside.

The specific means hereinafter set forth for carrying out my invention may be varied without departing from the invention or from the method of operation, which I believe to be entirely novel.

In the accompanying drawings, Figure 1 is a view in elevation, showing a portion of a wheel provided with a pneumatic single-tube tire embodying my invention. Fig. 2 is an enlarged detail sectional view showing the valve in the tire and means for closing the same. Fig. 3 is a section on the line 3 3 of Fig. 1, showing also a temporary patch in place and means for inserting same. Fig. 4 is a transverse section showing the valve with string attached thereto. Fig. 5 is a detail view of the tool for catching the string and drawing it through punctures, and Fig. 6 is a detail of one of the patching-plugs.

As seen in the drawings, A is a pneumatic tire of the hose-pipe type, which is formed or provided with an opening B, the margins of which are suitably reinforced at $b$. A removable closure is provided for the opening B, which, as here shown, comprises a plate C, having an eyelet $C'$ on the inner side thereof. Said plate may also be provided with rounded inner edges, as indicated at D, which may be faced with elastic material or be a portion of the plate, as desired. A similar plate E is adapted to fit over the opening B on the outside and may also be provided with elastic edges $e$, as indicated, although these may be omitted without departing from the invention. A screw-threaded stem F extends from the plate C through a corresponding opening in the plate E, and by applying the nut $f$ the plates will be drawn together and the opening be closed air-tight. A string G is passed through the inside of the tire, and its ends are to be fastened in the eyelet $C'$, as indicated in Fig. 4.

H is a piece of spring metal, one end of which is curved to form a handle, the other end being pointed and provided with a barb $h$.

The method of operation when permanently repairing a puncture is to first remove the valve comprising the plates C E, bringing with the plate C the ends of the string G, one end of which is then tied or otherwise attached to the stem $i$ of the plug I, which is of soft rubber or any other material suitable for the purpose. The hook H is then inserted through the puncture and its inner end moved about within the tire until it catches the string G, when it is drawn out through the puncture, bringing the string with it. The patch with the string tied to it is then inserted through the opening B, after which by pulling upon the string projecting through the puncture the stem of the patch is drawn therethrough. At this point the operator may either detach the string from the plug and pull it back into position or hold onto the stem of the plug therewith as a means of keeping the same in desired position. An adhesive, such as the ordinary patching-cement, is then injected around the stem of the patch between the patch and the inside of the tire, after which the valve is replaced, the tire pumped up, and the repair is completed, except trimming off the surperfluous end of the stem $i$. The string G should be long enough to allow of its being drawn through the puncture without the ends entering the tire, although if lost in that way a new one can easily be replaced therein by attaching a weight to one end, rolling the stem around the tire, and removing through the opening B. Where it is preferred to make a temporary repair, I provide a metallic plug J, having a screw-threaded stem $j$, to which for convenience of insertion I attach a screw-threaded connection K, to which the string is secured, as indicated in Fig. 3. When this has been drawn into position, as described in connection with the rubber plug I, instead of using cement to complete the repair I apply on the outside of the tire a screw-threaded washer $k$, by which the plug J is drawn airtight against the inside of the tire. The plug J may have a lining of elastic material $j'$, if preferred.

It will be noted that the opening B is on the side of the tire away from the tread thereof and is preferably of an elongated form. When the tire is deflated, this opening may readily be expanded to receive the largest plug, and by this means large cuts which could not otherwise be repaired may be repaired by first sewing up the cut, all except an opening large enough for the stem of the plug, and then inserting a plug large enough to cover the injured spot through the opening B, according to the method hereinbefore described.

Various minor modifications may be made without departing from the spirit of the invention in view of the description given.

Having described my invention, what I claim is—

1. The herein-described method of repairing punctured single-tube tires which consists in first drawing a string through the puncture from the inside; then introducing a patching-plug from the exterior into the interior of the tire and by means of the string drawing the stem thereof through the opening, then introducing an adhesive between the plug and the margin of the puncture.

2. The combination with a single-tube pneumatic tire, of a valved opening thereinto located in the side thereof, and a string extending through the inside of the tire and connected with the valve.

3. The combination with a single-tube pneumatic tire, of a valve located in the side of the tire between the rim and the tread and opening thereinto, and a string extending through the inside of the tire and having its ends secured to the valve and adapted to be brought outward through the opening.

4. A single-tube pneumatic tire formed with an elongated opening in the side thereof, said opening having reinforced edges, a stopper or valve removably secured in said opening for closing the same, and a string extending through the inside of the tire and having its ends connected with the inner part of the valve and adapted to be drawn out through the opening in the tire.

5. The combination with a single-tube pneumatic tire, of a valved opening thereinto, a string extending through the tire and secured to the valve on the inside of the tire, and a hook adapted to pass through a puncture in the walls of the tire and to engage the string to draw it outward through the opening through which said hook was introduced, and a plug of repair material adapted to be fastened to the string and introduced into the tire through the valved opening and thence drawn into position to close the puncture.

In testimony whereof I hereto affix my signature in presence of two witnesses.

RICHARD WEHL.

Witnesses:
J. H. HOCKMAN,
ARTHUR X. WEISENBURGER.